(12) United States Patent
Dawson et al.

(10) Patent No.: US 11,314,475 B2
(45) Date of Patent: Apr. 26, 2022

(54) CUSTOMIZING CONTENT DELIVERY THROUGH COGNITIVE ANALYSIS

(71) Applicant: Kyndryl, Inc., New York, NY (US)

(72) Inventors: Christopher J. Dawson, Arlington, VA (US); John M. Ganci, Jr., Raleigh, NC (US); Christopher L. Molloy, Raleigh, NC (US); Craig M. Trim, Ventura, CA (US)

(73) Assignee: KYNDRYL, INC., New York, NY (US)

( * ) Notice: Subject to any disclaimer, the term of this patent is extended or adjusted under 35 U.S.C. 154(b) by 43 days.

(21) Appl. No.: 16/197,885

(22) Filed: Nov. 21, 2018

(65) Prior Publication Data

US 2020/0159487 A1 May 21, 2020

(51) Int. Cl.
*G06F 17/00* (2019.01)
*G06F 3/16* (2006.01)
*G06N 5/02* (2006.01)
*G06N 20/00* (2019.01)

(52) U.S. Cl.
CPC .............. *G06F 3/16* (2013.01); *G06N 5/022* (2013.01); *G06N 20/00* (2019.01)

(58) Field of Classification Search
CPC ...... G06F 16/639; G06F 16/68; G06F 16/637; G06F 16/4387; G06F 16/635; G06F 16/435; G06F 16/437; G06F 16/636; G06F 16/9535; G06F 3/165; G06F 3/16; G06Q 30/0269; G06Q 50/01; H04L 67/22; H04R 2227/005; G06N 20/00; G06N 5/022

USPC .............. 700/94; 705/14.66; 706/46, 47; 707/E17.005, E17.014, E17.033, E17.101, 707/748, 749, 999.005, 999.102; 709/224, 205, 219

See application file for complete search history.

(56) References Cited

U.S. PATENT DOCUMENTS

| 8,666,525 B2 | 3/2014 | Stefik | |
| 9,183,822 B2 | 11/2015 | MacPherson | |
| 2006/0095516 A1* | 5/2006 | Wijeratne | G06Q 30/02 709/205 |
| 2009/0222392 A1 | 9/2009 | Martin et al. | |
| 2013/0031216 A1* | 1/2013 | Willis | G06Q 50/01 709/219 |

(Continued)

FOREIGN PATENT DOCUMENTS

CN 101992779 A 3/2011

*Primary Examiner* — Paul C McCord
(74) *Attorney, Agent, or Firm* — Erik Swanson; Madeline F. Schiesser; Keohane & D'Alessandro, PLLC

(57) ABSTRACT

Approaches presented herein enable customization of content being consumed at a location. More specifically, a plurality of participants is identified as being located within an area. A data source corresponding to each of at least two participants is analyzed for preferences of the participants. Based on this analysis, a set of preferences for the participants is mapped, and this mapping includes linking related preferences of different participants. A sentiment of the plurality of participants is identified based on a real-time data feed that captures actions of the plurality of participants located within the area. A scored set of content is selected based on the mapped set of preferences and the identified sentiment of the plurality of participants.

20 Claims, 5 Drawing Sheets

(56) References Cited

U.S. PATENT DOCUMENTS

| | | | | |
|---|---|---|---|---|
| 2014/0031961 A1* | 1/2014 | Wansley | ............ | G06F 16/68 |
| | | | | 700/94 |
| 2016/0371371 A1* | 12/2016 | Chong | ............ | G06F 16/636 |
| 2017/0060519 A1* | 3/2017 | Roberdet | ............ | H04R 27/00 |
| 2017/0300568 A1 | 10/2017 | Burgis | | |
| 2018/0088895 A1* | 3/2018 | Pedersen | ............ | G06F 3/011 |

\* cited by examiner

CUSTOMIZING CONTENT DELIVERY THROUGH COGNITIVE ANALYSIS

TECHNICAL FIELD

The present invention relates generally to media content delivery and, more specifically, to a solution for customizing audio content being consumed by a group of people in real time.

BACKGROUND

In many parts of the world, most people hear music on a daily basis. In some cases, this music can be something that a person intentionally chooses to listen to, such as a playlist on a personal device, or it can be "background music," played over a speaker system at a public or private place, such as a restaurant, a store, or a social gathering. Music streaming services have become a popular way to listen to music for the individual. Services, such as Amazon Music Unlimited/Prime Music, Apple Music, iTunes, YouTube Music and Google Play Music, Pandora, Slacker Radio, and Spotify, offer libraries or channels of songs that users can stream to their devices and, in some cases, download for a fee. (All trademarks and trade names used herein are the property of their respective owners and are used for illustrative and descriptive purposes only.) Some services also allow users to identify artists or styles of music that they prefer and then provide the users with recommendations for similar artists or music styles. Music, in addition to providing a means of self-expression, can affect people in various ways, ranging from emotion regulation to cognitive development. As such, a person's selection of music can have a profound effect on his or her mood and activity.

SUMMARY

Approaches presented herein enable customization of content being consumed at a location. More specifically, a plurality of participants is identified as being located within an area. A data source corresponding to each of at least two participants is analyzed for preferences of the participants. Based on this analysis, a set of preferences for the participants is mapped, and this mapping includes linking related preferences of different participants. A sentiment of the plurality of participants is identified based on a real-time data feed that captures actions of the plurality of participants located within the area. A scored set of content is selected based on the mapped set of preferences and the identified sentiment of the plurality of participants.

One aspect of the present invention includes a method for customizing content being consumed at a location, comprising: identifying a plurality of participants as being located within an area, the plurality comprising a first participant and a second participant; analyzing a first data source corresponding to the first participant for musical preferences of the first participant and analyzing a second data source corresponding to the second participant for musical preferences of the second participant; mapping, based on the analysis, a set of musical preferences for the first and second participants, the mapping comprising linking related music preferences of the first and second participants; identifying a sentiment of the plurality of participants based on a real-time data feed that captures actions of the plurality of participants located within the area; selecting a scored set of music content to play based on the mapped set of musical preferences and the identified sentiment of the plurality of participants; and causing music content to be played from the set of music content.

Another aspect of the present invention includes a computer system for customizing content being consumed at a location, the computer system comprising: a memory medium comprising program instructions; a bus coupled to the memory medium; and a processor, for executing the program instructions, coupled to a group music listening experience engine via the bus that when executing the program instructions causes the system to: identify a plurality of participants as being located within an area, the plurality comprising a first participant and a second participant; analyze a first data source corresponding to the first participant for musical preferences of the first participant and analyzing a second data source corresponding to the second participant for musical preferences of the second participant; map, based on the analysis, a set of musical preferences for the first and second participants, the mapping comprising linking related music preferences of the first and second participants; identify a sentiment of the plurality of participants based on a real-time data feed that captures actions of the plurality of participants located within the area; select a scored set of music content to play based on the mapped set of musical preferences and the identified sentiment of the plurality of participants; and cause music content to be played from the set of music content.

Yet another aspect of the present invention includes a computer program product for customizing content being consumed at a location, the computer program product comprising a computer readable hardware storage device, and program instructions stored on the computer readable hardware storage device, to: identify a plurality of participants as being located within an area, the plurality comprising a first participant and a second participant; analyze a first data source corresponding to the first participant for musical preferences of the first participant and analyzing a second data source corresponding to the second participant for musical preferences of the second participant; map, based on the analysis, a set of musical preferences for the first and second participants, the mapping comprising linking related music preferences of the first and second participants; identify a sentiment of the plurality of participants based on a real-time data feed that captures actions of the plurality of participants located within the area; select a scored set of music content to play based on the mapped set of musical preferences and the identified sentiment of the plurality of participants; and cause music content to be played from the set of music content.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
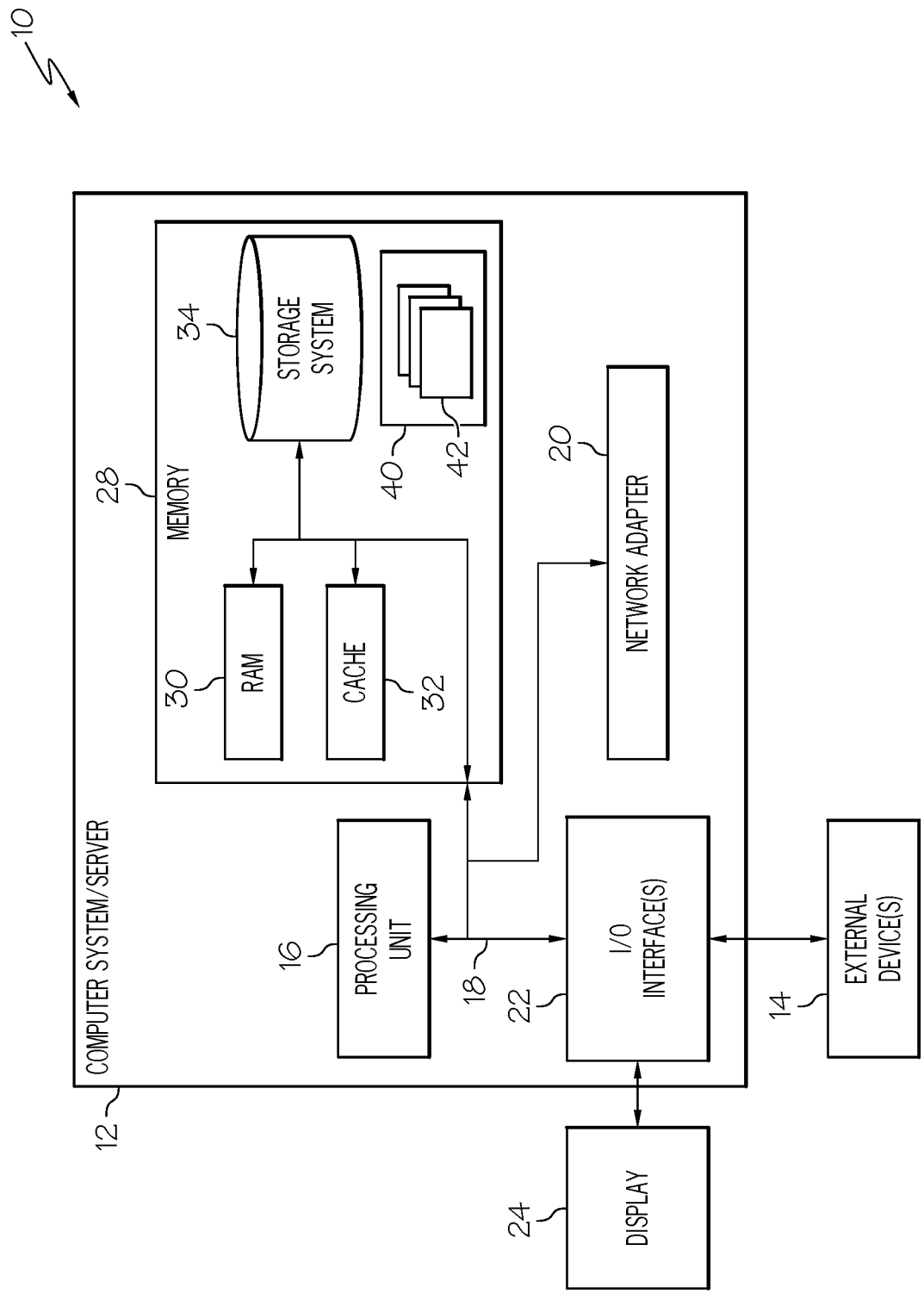
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for customization of content being consumed at a location. More specifically, a plurality of participants is identified as being located within an area. A data source corresponding to each of at least two participants is analyzed for preferences of the participants. Based on this analysis, a set of preferences for the participants is mapped, and this mapping includes linking related preferences of different participants. A sentiment of the plurality of participants is identified based on a real-time data feed that captures actions of the plurality of participants located within the area. A scored set of content is selected based on the mapped set of preferences and the identified sentiment of the plurality of participants.

Referring now to FIG. 1, a computerized implementation 10 of an embodiment for customizing content being consumed at a location will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for customizing content being consumed at a location. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more sub-systems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for customizing content being consumed at a location, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found certain deficiencies in current solutions for delivering a selection of music to a group of people. Some current solutions rely on static playlists, containing music preselected and placed in an order by a person prior to a social gathering where the music will be played. Some other solutions permit a host of a social gathering to play automated music from a music streaming service selected by the host. Using such a service still has many deficiencies though, as the service is only trained on the tastes of the host, and not his or her guests. Further, such a service lacks a means of gauging whether music is appropriate for the setting of the gathering or gauging a mood/interest in the music from a roomful of guests at the gathering. As such, current music streaming services also lack the ability to respond to changes in the room or recognize whether a particular music track is well received or not. Although a human DJ may be employed to respond to music requests of guests in the room, this requires active human participation, which, in addition to being inefficient, can detract from the social gathering. Furthermore, a human DJ can only guess at the overall musical preferences of event guests and, while he or she can take song requests, this results in the DJ failing to consider the preferences of any but the most vocal guests.

Accordingly, the inventors of the present invention have developed a system that improves a music listening experience for a group of people based on cognitive analysis of music preferences, a given event which the group is attending, an environment in which the group is gathered, and an emotional state and/or actions of members of the group. As such, embodiments of the present invention offer several advantages over previous solutions. For instance, embodiments of the present invention permit a music delivery system to automatically select music tracks suitable for a particular gathering of people. Embodiments enable the music delivery system to consider a venue, a current activity, an identity, a music preference, a priority/VIP status, and a mood of participants engaging in the music listening experience. Furthermore, embodiments enable the music delivery system to make these considerations in real time, adapting a music playlist responsive to changes in the gathering, such as the coming or going of a participant, a response of a participant to the music, or any other action of any participant at the gathering. This results in a more nuanced music delivery system that increases a likelihood that all participants in a music listening experience will enjoy that experience.

Figure 2:
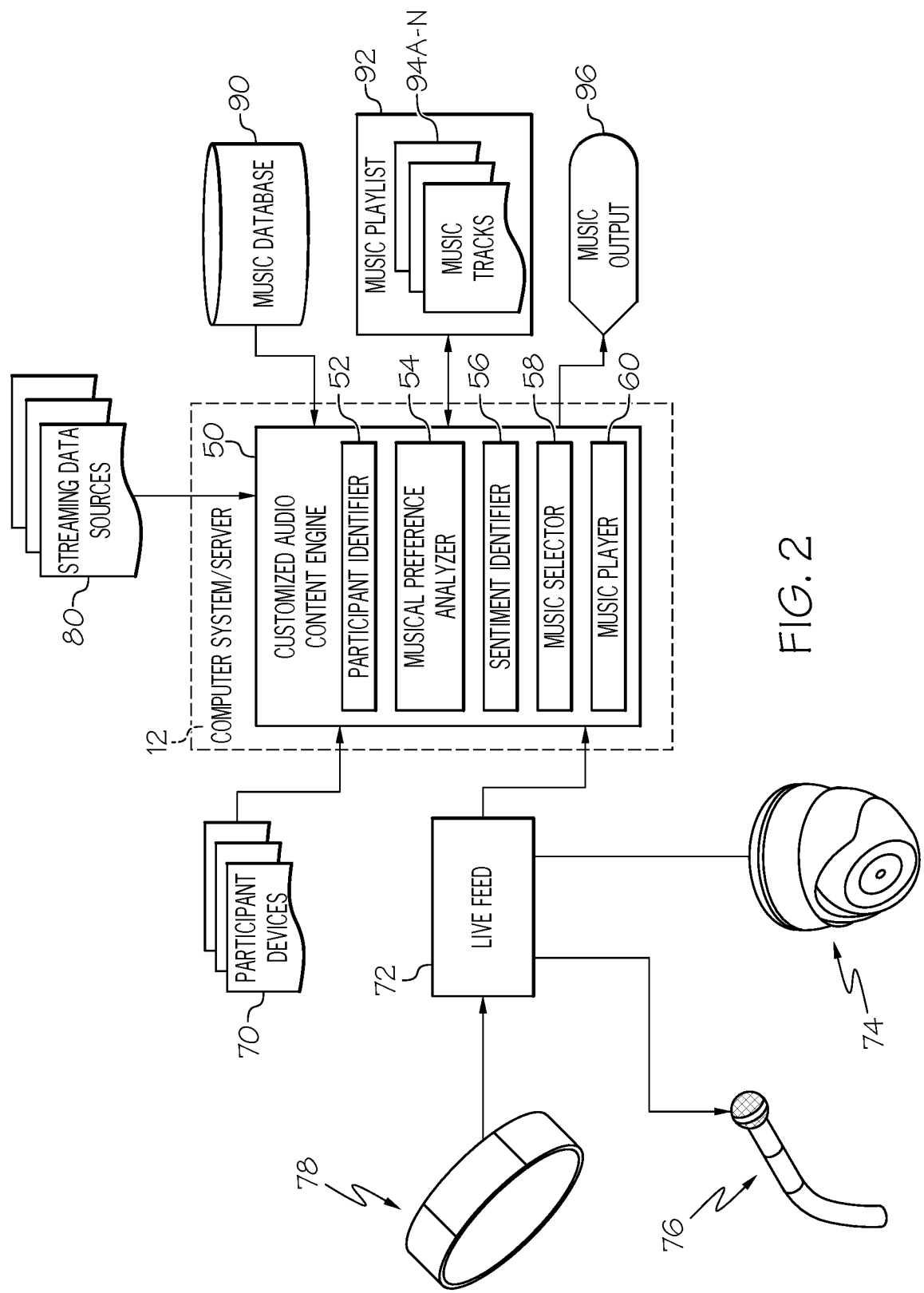
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment). A stand-alone computer system/server 12 is shown in FIG. 2 for illustrative purposes only. In the event the teachings recited herein are practiced in a networked computing environment, each client need not have a customized audio content engine 50 (hereinafter "system 50"). Rather, all or part of system 50 could be loaded on a server or server-capable device that communicates (e.g., wirelessly) with the clients to provide for customizing content being consumed at a location. Regardless, as depicted, system 50 is shown within computer system/server 12. In general, system 50 can be implemented as program/utility 40 on computer system 12 of FIG. 1 and can enable the functions recited herein.

Along these lines, system 50 may perform multiple functions similar to a general-purpose computer. Specifically, among other functions, system 50 can customize content being consumed at a location in a networked computing environment. To accomplish this, system 50 can include a set of components (e.g., program modules 42 of FIG. 1) for carrying out embodiments of the present invention. These components can include, but are not limited to, participant identifier 52, music preference analyzer 54, sentiment identifier 56, music selector 58, and music player 60.

Through computer system/server 12, system 50 can detect the presence of participant devices 70, receive information from streaming data sources 80, and identify actions of the participants observed in live data feed 72 from visual sensor 74, audio sensor 76, and/or biometric sensor 78. System 50 can also be in communication with a music database 90, which can contain a library of music tracks, music channels/playlists, or other music/audio data. Furthermore, in some embodiments, system 50 can, as enabled by computer system/server 12, produce a music playlist 92 containing music tracks/content 94A-N or a listing thereof. Additionally, in some embodiments, system 50 can output or cause to be outputted music 96 from playlist 92.

These and other features of this invention will be more readily understood from the following description of various embodiments of the invention along with the Figures below described.

Figure 3:
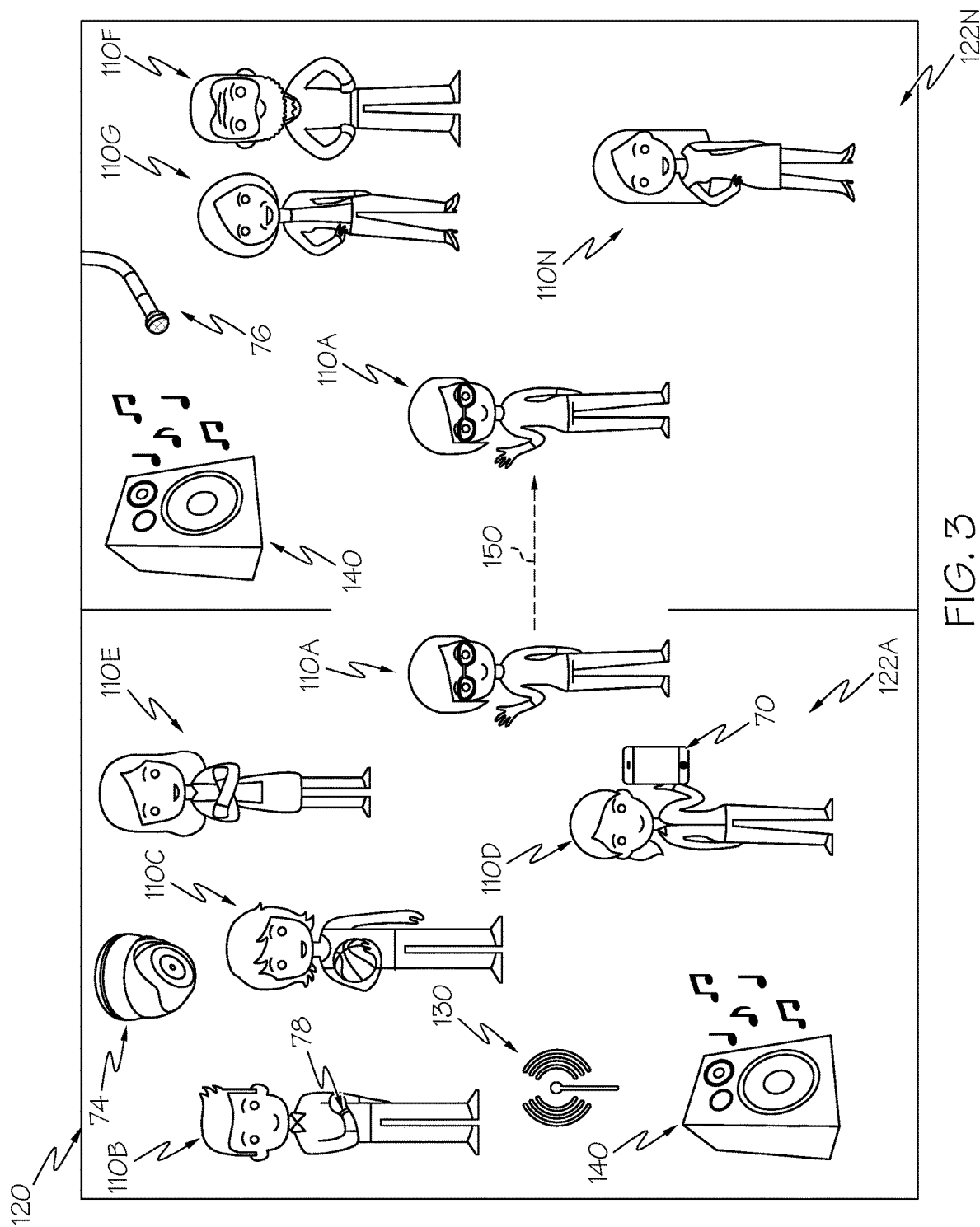
FIG. 3 shows an example physical implementation area according to illustrative embodiments.

Referring now to FIG. 3 in connection with FIG. 2, an example physical area 100 in which an embodiment of the present invention can be implemented is shown. Participant identifier 52, as performed by computer system/server 12, can identify a plurality of participants 110A-N (110N in the generic singular) as being located within an area 120, the plurality comprising a first participant 110A and a second participant 110N. In some embodiments area 120 can have more than one section, such as section 122A and section 122N, in each of which an embodiment of the present invention is separately carried out. To accomplish the participant identification, in some embodiments, participant identifier 52 can include or be in communication with a signal sending/receiving device/beacon 130 configured to recognize an identification signal transmitted from one or more participant devices 70 of participants 110A-N who have opted-in to system 50 and/or to broadcast an identification request signal to one or more participant devices 70 and receive responses from participants 110A-N who have opted-in to system 50. Participant devices 70 can include, but are not limited to, mobile and/or wearable devices, such as a smart phone, a tablet, a smartwatch, or an activity tracker. Sending/receiving device 130 can use any type of network or protocol presently known or later developed, such as LAN and/or a WAN (e.g., T1, T3, 56 kb, X.25), broadband connections (ISDN, Frame Relay, ATM), wireless links (802.11, Bluetooth, etc.), or a GPS network. A device identification signal can include, if enabled by a participant 110N, an identity of the owner/user of the device and/or a device identification that participant identifier 52 can match to a participant 110N. In some embodiments, participant identifier 52 can use this identification signal to not only identify participant 110N in area 120, but also to determine a location of participant 110N within area 120. Once the location of participant 110N within area 120 is identified, participant identifier 52 can match the identification of participant 110N with an image of participant 110N from live data feed 72 of visual sensor 74 of area 120.

Additionally or alternatively, in some embodiments, participant identifier 52 can use other methods to identify participants 110A-N, such as facial/object recognition, connections on a social network, and/or prior registration for an event. For example, if a participant 110N has previously been a participant in a music listening experience orchestrated by system 50, participant identifier 52 can recognize the face and therefore the identity and pre-established preferences of that participant. Such identifying data, as well as any other data from each listening experiences with system 50, can be deleted or archived once system 50 completes the listening experience, based on a permission or other configuration provided by participant 110N when he or she opts-in to system 50 or at any other time. In another example, participant identifier 52 can access a social media of one or more identified participants 110A-N and check an image of an unknown participant 110N against friends of identified participants 110A-N. In still another example, a participant 110N can register his or her device or identity before an event or at a specific gathering venue, allowing participant identifier 52 to identify him or her.

It should be understood that in some embodiments, participants 110A-N can opt-in to system 50. Furthermore, when participants 110A-N opt-in, system 50 can inform participants 110A-N of what data system 50 will collect and how such data will be used. Moreover, system 50 can encrypt any collected personal data while the data is being used and inform participants 110A-N of this at opt-in. System 50 can also inform participants 110A-N that they can opt out at any time, and that, if a participant 110N opts out, any personal data of participant 110N is deleted.

In the case that a participant 110N cannot be recognized through his/her device, such as participant 110C, who has no device, participant identifier 52 can obtain images of unknown participant 110C from visual sensor 74 of live feed 72 of area 120 and generate a basic identity for unknown participant 110C based on recognized features of unknown participant 110C. For example, participant identifier 52 can use object recognition to estimate an age, height (e.g., a person under 4 feet is likely a child), gender, cultural identification, and other demographics of unknown participant 110C. Furthermore, participant identifier 52 can recognize clothes worn by unknown participant 110C or items in which he shows interest. In this example, based on the sports jersey and sports ball held by unknown participant 110C, participant identifier 52 can determine that unknown participant 110C is a teenage boy who likes sports and participant identifier 52 can use this description as a substitute identity for unknown participant 110C.

In some embodiments, participant identifier 52 can assign a weighted value to at least one participant 110N of the plurality of participants 110A-N. Participant identifier 52 can receive identifications of some participants of plurality 110A-N who are to be assigned a greater weighted value or "VIP" status, or, alternatively or additionally, participant identifier 52 can receive an identification of the types of participants who should be assigned this greater weighted value from a user of system 50. In some embodiments, participant identifier 52 can automatically assign a participant 110N a weighted status based on historical data indicating similar participants received a weighted status. This weighted status will be used by music selector 58 to score music tracks and determine which tracks should be played, as will be discussed in more detail further below. This increased weighted value of some participants can be based on factors such as age, height, and health condition (e.g., some music may not be suitable for a child, senior citizen, or someone with a heart condition), "guest of honor" status (e.g., bride and groom or wedding party, anniversary couple, birthday boy/girl), or closeness of a host of an event to the participants. For example, in section 122N, participants 110G and 110F are grandparents. Participant identifier 52 can assign them a higher weighted value than other participants in order to ensure that any music tracks/content selected are appropriate for a gathering at which one's grandparents are present (i.e., no music with explicit lyrics will be played when grandma and grandpa are in the room, unless they like such music). In the case that a closeness of participants to a host is a factor in the weighting, participant identifier 52 can access a social network profile of the host to identify to which participants the host is closest (e.g., based on the most mutual friends/links).

Music preference analyzer 54, as performed by computer system/server 12, can analyze a first data source 80 corresponding to the first participant 110A for musical preferences of the first participant 110A and analyze a second data source 80 corresponding to the second participant 110N for musical preferences of the second participant 110N. In some embodiments, this data source can be a music streaming service, such as Amazon Music Unlimited/Prime Music, Apple Music, iTunes, YouTube Music and Google Play Music, Pandora, Slacker Radio, or Spotify. Music preference analyzer 54 can access, in real time, a music streaming service account of participant 110N through device 70 of participant 110N in the case, for example, that device 70 contains a dedicated application for that streaming data source 80 and/or that participant 110N is logged into the account on that device. Music preference analyzer 54 can transmit a message to participant device 70 requesting participant device 70 transmit certain music streaming data to system 50. Additionally or alternatively, preference analyzer 54 can obtain music streaming service account access information from device 70 (with permission from participant 110N) and directly access the account of participant 110N to retrieve or review certain music streaming data.

This music streaming data can include musical preferences of participant 110N taken from a music listening history of participant 110N and/or from an analysis by the streaming service that previously categorized preferences of the participant. In other words, in some embodiments, preference analyzer 54 can access a music preferences analysis/profile created by a music streaming service for participant 110N in order to determine music preferences of participant 110N. Such preferences can include, for example, artists (e.g., bands, singers, composers), a play history (e.g., recent tracks listened to by participant 110N), genres or styles (e.g., classical, easy listening, rock, country, pop, folk, rap, hip hop, jazz, swing, rhythm), eras (e.g., baroque, classical, romantic, romantic, 50s, 60s, 70s, 80s, 90s), and musical elements (e.g., rhythm, volume, instruments, vocals, harmonies, tempo, octaves, major/minor cords, etc.).

Additionally or alternatively, in some embodiments, preference analyzer 54 can access (with permission of participant 110N) an internet browsing or social media (e.g., Facebook, Twitter, Google) history of participant 110N to discover music listening preferences of participant 110N. For example, preference analyzer 54 can determine if participant 110N has liked any artists, genres, or styles of music on a social media site or browsed any web pages associated with the same. Furthermore, preference analyzer 54 could determine if participant 110N has ever taken pictures at or checked him/herself in at a location associated with an artist, genre, or style of music, such as a concert arena or other venue when a particular band was performing.

In the case that an identity of participant 110N is unknown or that preference analyzer 54 is unable to access a music streaming source 80 or social media/browsing history of participant 110N, preference analyzer 54 can construct or assign a speculative music preferences profile for that participant based off of any information that can be determined about the participant. For example, returning to the example above, participant identifier 52 determined that unknown participant 110C is a teenage boy who likes sports. From this discerned information, preference analyzer 54 can assign a music preferences profile that is typical (e.g., based on historic data analysis of previous participants) of a teenage boy who likes sports to unknown participant 110C. As such, based on unknown participant's 110C clothing and objects around him, preference analyzer 54 can assume that unknown participant 110C likes upbeat, workout type music and other certain types of modern music.

Figure 4:
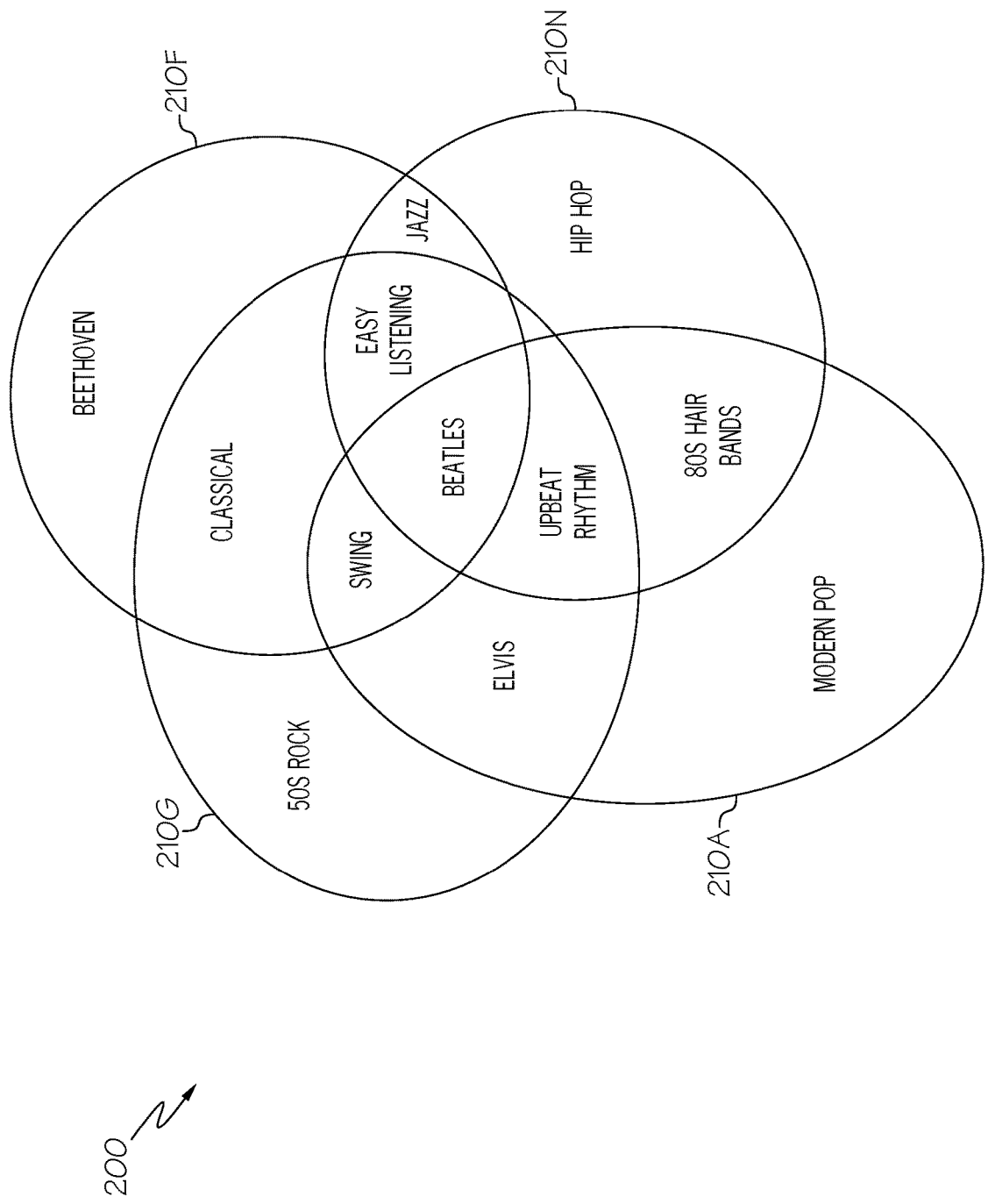
FIG. 4 shows an example mapping of participant music interests according to illustrative embodiments.

Referring now to FIG. 4, in connection with FIG. 2 and FIG. 3, an example mapping 200 of participant music interests is shown. Music preference analyzer 54, as performed by computer system/server 12, can also map, based on the analysis, a set of musical preferences 210A, 210N for the first and second participants 110A, 110N, the mapping comprising linking related music preferences of the first and second participants 110A-N. To accomplish this, music preference analyzer 54 can conduct a cognitive analysis of the music streaming data received, retrieve, or otherwise obtained from streaming data sources 80 for each participant 110A-N. Music preferences of participants 110A-N can be mapped in a cognitive system to generate cognitive music preferences profiles 210A-N (210N in the generic singular) for each participant 110N. The cognitive system can be configured to classify music preferences as a disparate set of input data based on categories, related preferences, and other similarities using any cognitive classification technique presently known or later developed.

Music preference analyzer 54 can find common categories or other related fields between different cognitive music preferences profiles 210A-N of different users 110A-N. Music preference analyzer 54 can create links between these common areas, determining music preferences that two or more participants 110A-N share and music preferences that are considered related between two or more participants 110A-N. These common/overlapping areas can include, but are not limited to, artists, played tracks, genres or styles, eras, and musical elements. For example, cognitive music preferences profile 210G of participant 110G indicates that, among other preferences, participant 110G prefers 50s rock, classical music, and Elvis. Cognitive music preferences profile 210G of participant 110G further shows that her preferences for classical music overlaps with cognitive music preferences profile 210F of participant 110F and her preference for Elvis-type music overlaps with cognitive music preferences profile 210A of participant 110A.

Referring now back to FIG. 3, in connection with FIG. 2, sentiment identifier 56, as performed by computer system/server 12, can identify a sentiment of the plurality of participants 110A-N based on a live data feed 72 that captures actions of the plurality of participants 110A-N located within the area 120. To accomplish this, sentiment identifier 56 can receive live data feed 72 from one or more sensors that monitor one or more participants 110A-N and/or area 120. These sensors can include, but are not limited to, visual sensors 72 (e.g., a video camera), audio sensors 76 (e.g., a microphone), motion sensors (not shown) (e.g., floor pressure sensors, infrared motion sensors, accelerometer sensors on the body of participant 110N), biological sensors 78 (e.g., wearables, such as activity trackers, smart watches containing sensors that measure a user's blood pressure, pulse/heart rate, and/or temperature), etc.

Sentiment identifier 56 can obtain a variety of types of data representative of a sentiment, emotional state, or activity of participants 110A-N. For example, in some embodiments, sentiment identifier 56 can capture verbal sentiments (e.g., from audio sensor 76), such as words spoken by participant 110N and their meaning as would be interpreted from a transcript of those spoken words. Sentiment identifier 56 can also or alternatively capture non-verbal and/or paralanguage sentiments (e.g., from audio sensor 76 that detects a tone of words spoken by participants 110A-N, from visual sensor 74 or a motion sensor that detects actions and a physical presence of participants 110A-N), including expressions indicated using signals other than words, such as facial expressions, posture, gestures, appearance, personal space, foot movements, hand movements, etc. Such non-verbal sentiments can include, but are not limited to, body language (kinesics), distance (proxemics), physical environment and appearance, voice (paralanguage), touch (haptics), timing (chronemics), and oculesics (e.g., eye contact, looking while talking, frequency of glances, patterns of fixation, pupil dilation, blink rate, etc.). Such paralanguage sentiments can include, but are not limited to, voice quality, rate, pitch, volume, mood, and speaking style, as well as prosodic features such as rhythm, intonation, and stress. In some embodiments, sentiment identifier 56 can also or alternatively obtain a data feed from biologic sensor 78, such as a sensor in a wearable device, monitoring a physical condition (e.g., blood pressure, heart rate, temperature) or a physical activity (e.g., walking, sitting, dancing from a pedometer) of participant 110N.

Sentiment identifier 56 can analyze live data feed 72 for verbal, non-verbal, paralanguage, and biometric sentiments of participants 110A-N. To accomplish this, sentiment identifier 56 can use machine learning techniques to identify features of activities, expressions, and other actions captured in live data feed 72 and assign those features values (e.g., ratings, such as on a 1-10 scale or percentage) indicative of a sentiment state of each participant 110N (e.g., a participant 110N who is standing in a corner alone may be assigned a particular code or value, whereas a participant 110N who crosses his or her arms may be assigned a different code or value). In some embodiments, sentiment identifier 56 can use posture recognition techniques (e.g., based on existing object recognition techniques) to identify a posture of participant 110N and a significance of that posture. For example, sentiment identifier 56 can determine from live data feed 72 of visual sensor 74 that participant 110E has her arms crossed, indicating discomfort. In some embodiments, additionally or alternatively, sentiment identifier 56 can use facial recognition techniques to identify a mood, cognitive state, or feeling of participant 110N, such as joy, fear, sadness, anger, surprise, or contempt, indicating each with a value. For example, sentiment identifier 56 can determine from the smiling face of participant 110A that she is 80% joyful, 10% fearful, and 10% surprised, corresponding with code "123". In still some other embodiments, additionally or alternatively, sentiment identifier 56 can use space recognition techniques to assess how participant 110N occupies and makes use of the space, such as a dance floor or socializing area. For example, sentiment identifier 56 can determine from live data feed 72 of visual sensor 74 that participant 110D is in a dancing area and dancing on her own. In some other embodiments, additionally or alternatively, sentiment identifier 56 can use hand pose and gesture recognition techniques to identify a meaning, expression, or other significance of gestures or hand placement by participant 110N, such as exposing palms or keeping hands in pockets, behind one's back, or on one's hips. For example, sentiment identifier 56 can determine from a visual or motion data feed that participant 110G has a hand on her hip and one at her side, conveying comfort, openness, and some degree of authority, and therefore receiving a hand usage rating indicating these emotions.

In some embodiments, sentiment identifier 56 can use vocal recognition techniques to analyze an audio feed from audio sensor 76. These vocal recognition techniques can be used to identify paralanguage elements expressed by participants 110A-N and to assign those elements values (e.g., ratings, such as on a 1-10 scale or percentage) indicative of the participant's mood. Paralanguage elements of vocal expressions of participants 110A-N can include, but are not limited to, voice rate (e.g., fast, walking-speed, slow), pitch (e.g., higher or lower than normal for participant 110N), volume (e.g., private conversation or addressing the room at large), mood (e.g., positive, angry, hopeful), rhythm (e.g., smooth, halting), intonation (e.g., inflections), stress (e.g., choice of words emphasized), and other elements of verbal expression. The vocal recognition techniques can also be used to parse the meaning (i.e., definition) of words spoken by participant 110N or a transcript of these words. Sentiment identifier 56 can assign values to parsed/transcribed words based on a known connotation of the words, such as found in a dictionary or other reference resource. Sentiment identifier 56 can also assign ratings or other values for phrases spoken by participant 110N. This may be accomplished by generating a conglomerate score for the phrase based on values of words therein contained. In some further embodiments, sentiment identifier 56 can weight particular words or phrases spoken by participant 110N based on recognized non-verbal or paralanguage behavior accompanying a word or phrase. For example, a word or phrase that is accompanied by stressing the word or a hand movement (e.g., "Rock on!" with a hand gesture associated with hard rock music) can be assigned a more weighted value than a transitory word accompanied by none of these.

In some embodiments, sentiment identifier 56 can also analyze a data feed from biologic sensor 78 monitoring a physical condition of participant 110N. For example, sentiment identifier 56 can determine from the wearable on the wrist of participant 110G that his blood pressure, heart rate, and temperature are above normal. Sentiment identifier 56 can compare such readings to known standard biological readings (such as data charts) or a bio-reading history associated with participant 110G to determine a physical condition of participant 110G indicated by the reading. In this example, participant's 110G elevated pulse may be indicative of a nervous or excited state.

It should be understood that sentiment identifier 56 can combine any type of live data feed 72 and any sentiment recognition techniques to gain a full picture of a sentiment of participants 110A-N, such as combining facial expression recognition with biometric readings to discover whether a biological reaction to music, such as an increased pulse, from participant 110N corresponds with a happy state or a distressed state.

According to some embodiments of the present invention, sentiment identifier 56 can use these sentiment recognition techniques both initially, to assist music selector 58 in creating playlist 92 as described further below, and on the fly, as participants are listening to a track/content 94N (of a plurality of tracks/content 94A-N (94N in the generic singular) on playlist 92). In the latter case, sentiment identifier 56 can determine whether currently playing track 94N of playlist 92 is well received (e.g., is sentiment of participants 110A-N positive or negative?) and/or having a desired effect (e.g., if dance music, are people dancing?), or not. For example, if sentiment identifier 56 recognizes that participants 110A-N are dancing and tapping their feet to currently playing track 94N, then it is well received, and music selector 58 made a correct choice in adding that track 94N to playlist 92. However, if sentiment identifier 56 recognizes that participants 110A-N are uncomfortable (e.g., one or more participants is displaying unhappy body language, such as crossed arms and hunched shoulders), then currently playing track 94N is not well received, and music selector 58 should evaluate (as will be described in more detail further below) whether currently playing track 94N is a suitable selection for the group of participants 110A-N. In some embodiments, sentiment identifier 56 can also determine a sentiment of a participant 110N who was assigned a greater weighted value or "VIP" status and apply the same weighted value or status to the sentiment of that participant 110N for use by music selector 58, as described below.

In some embodiments, in the case that an identity of participant 110N is unknown or that preference analyzer 54 was unable to access a music streaming source 80 or social media/browsing history of participant 110N, sentiment identifier 56 can further build upon the basic music preference profile created or assigned to unknown participant 110N by preference analyzer 54. For example, preference analyzer 54 assumed that unknown participant 110C likes upbeat music. However, if upbeat music is currently being played and participant 110C shows little to no interest in the music, then the presumed music preferences of participant 110C can be modified to remove upbeat music from his preferences. Contra, if music (e.g., jazz) not in participant's 110C presumed music preferences is being played and participant 110C shows interest in that music (e.g., tapping his foot, singing along), then the presumed music preferences of participant 110C can be modified by adding that type of music, track, or artist to his music preferences.

In some further embodiments, sentiment identifier 56 can determine a location/venue or location/venue type (e.g., dining room, sitting room, vehicle, bar, dance club, fancy or casual restaurant, etc.), a time of day (e.g., breakfast, dinner, evening, etc.), an activity (e.g., eating dinner, breakfast business meeting, presentation, romantic date, socializing, dancing, etc.), and/or an event type (e.g., wedding, anniversary, birthday, convention, business meeting, party, etc.) associated with area 120. Sentiment identifier 56 can analyze live data feed 72 for visual and audio clues as to a location type, activity, and/or event type based on a cognitive analysis of live data feed 72, using techniques such as object recognition and speech-to-text. For example, if an analysis indicates that images from visual sensor 74 show men and women in suits around a table, sentiment identifier 56 can determine that the location is a conference room, an activity is a business conversation, and an event type is a business meeting. In another example, if an analysis indicates that images from visual sensor 74 show people in cocktail attire socializing, sentiment identifier 56 can determine that the location is a club, an activity is a casual conversation, and an event type is a cocktail party. In still another example, if an analysis indicates that images from visual sensor 74 show people in casual clothing dancing in a room of a house, sentiment identifier 56 can determine that the location is a living room of a home, the activity is dancing, and the event type is a house party among friends.

In some embodiments, system 50 can be transportable (e.g., system 50 resides on a smart phone or other portable device), capable of being carried from section 122A to section 122N of a building or other venue. For example, system 50 may be playing dinner-appropriate music in a dining room during a dinner, and subsequently system 50 may be carried into a den with a seating area. Sentiment identifier 56 of system 50 can recognize that the venue has changed and prompt music selector 58 to change playlist 92 accordingly to music appropriate to after-dinner socialization.

Music selector 58, as performed by computer system/server 12, can select a scored set of music content/tracks 94A-N (94N in the generic singular) to play based on the mapped set of musical preferences 210A-N and the identified sentiment of the plurality of participants 110A-N. These music contents/tracks 94A-N can be selected from a music library of any size, ranging from a pre-selected list of songs/tracks provided by a host of a social gathering to a global library of substantially most publicly available music tracks (e.g., a music streaming service's library). In some embodiments, music selector 58 can also or alternatively obtain music tracks or music track information from streaming data sources 80, such as music streaming service accounts, associated with one or more participants 110A-N. For instance, if a participant 110N has a strong fondness for a particular song, music selector 58 can retrieve identifying information about that song to potentially add it to playlist 92. In some embodiments, playlist 92 can be an ordered or unordered group of electronic audio files, with each of these electronic audio files being a track 94N of set of tracks 94A-N. In some other embodiments, playlist 92 can be merely an ordered or unordered list of music track identifiers (e.g., song name, artist name, track ID number) in a human or machine-readable format. In this latter case, playlist 92 can be sent to a music streaming service or other music playing resource attached to a music library, from which electronic audio files can be streamed or retrieved.

Music selector 58 can select tracks 94A-N that will enhance a music listening experience of participants 110A-N by selecting tracks 94A-N that are suitable for a mood/sentiment in area 120, the venue/setting/activity of area 120, and the music preferences 210A-N of participants 110A-N. Music selector 58 can create an event profile encompassing the mood/sentiment in area 120, the venue/setting/activity of area 120, and the music preferences 210A-N of participants 110A-N, and use this profile as a basis of comparison when determining which tracks are suitable for the event. The selection of tracks 94A-N can be accomplished any number of ways, such as, in some embodiments, by assigning tracks categorical tags that allow for filter along categories such as moods, event types, and music genres/styles/artists/etc., from the event profile. In some other embodiments, music selector 58 can build playlist 92 from an available pool of tracks, such as a pre-provided list or most popular tracks for particular categories, such as those listed above.

In some embodiments, music selector 58 can use the weighted values for certain VIP participants of participants A-N when determining which tracks 94A-N to select. This weighting can be applied to music preferences 210N of the VIP participants and/or sentiments of the certain participants in the event profile. Furthermore, the weighting can take any of several forms, such as magnifying an influence of the VIP participants in the created event profile (e.g., preferences/sentiments of VIPs count double when weighted against those of non-VIPs), or excluding any tracks that are inconsistent with the preferences of VIPs (e.g., do not play any track that is not within the preferences of VIPs participants 110F and 110G).

In some embodiments, music selector 58 can rank or score content/tracks from an available pool or music library based on the event profile. To accomplish this, music selector 58 can assign a score (e.g., 0-100) to each candidate track based on, for example, a strength of category tags associated with that music track against desired tags in the event profile. Music selector 58 can apply a threshold to the scores assigned to each track, such that only tracks 94A-N above a particular score are included in playlist 92. In some embodiments, music selector 58 can rank tracks 94A-N by score to create a list of tracks ordered by those most likely to please participants 110A-N. This ranking can be used to shuffle tracks 94A-N such that tracks of less interest to the crowd but of interest to some individuals may be dispersed among tracks catering more to a larger group interest.

In some embodiments, the weighting can cause music selector 58 to select a percentage or certain number of tracks suitable to the musical preferences 210N of the VIP participants. In some other embodiments, the weighting can cause music selector 58 to exclusively select tracks that are suitable to the musical preferences 210N of the VIP participants and which are also within the music preferences 210A-N of other participants 110A-N. However, in some embodiments, not all tracks 94A-N need to be music that all participants 110A-N will like, even in the presence of weighted value VIP participants. Rather, music selector 58 can apply a round robin style of music selection, such that music selector 58 selects a mix of tracks 94A-N, some of which will be better suited to some participants 110A-N than others. Turning again to the illustrative example in FIG. 4 in association with FIG. 3, based on the VIP status of grandparent participants 110G and 110F, music selector 58 can select tracks, the majority of which fall within music preferences 210F and 210G of participants 110F and 110G, respectively. An example of such a music selection is the following: 40% Beatles, 15% swing, 15% easy listening, 12% classical, 6% upbeat rhythm, 5% jazz, 5% Elvis, and 2% 80s hair bands. As such, music tracks 94A-N of interest to most or all participants 110A-N are the most prevalent, with tracks of interest to both VIP participants 110F and 110G also being prevalent, while tracks of interest to other non-VIP participants are still included, but less numerous.

In some embodiments, music selector 58 can modify playlist 92 in real time in response to a change in area 120. This change can include, but is not limited to, an entrance or exit of a participant 110N from area 120, a change in a sentiment of one or more of participants 110A-N, or a change to an area defined as area 120 (e.g., a switch from section 122A to 122N). For example, in response to movement 150 of participant 110A from section 122A to section 122N, sentiment identifier 56 removes preferences 210A of participant 110A from an event profile associated with section 122A and inserts preferences 210A of participant 110A into an event profile associated with section 122B. As such, music selector 58 recalculates which tracks 94A-N are, in light of the modified event profiles, suitable for each of section 122A and section 122B. Music selector 58 can add or delete tracks from playlist 92 as a result of a participant 110N entering or leaving.

In another example, sentiment identifier 56 can, as described above, monitor and identify the sentiments of participants 110A-N. As such, sentiment identifier 56 can monitor these participant's 110A-N sentiments as track 94N is playing from playlist 92. Should sentiment identifier 56 detect that the track is not well received by one or more participants 110A-N, such as through the detection of unhappy facial expressions or posture indicating discomfort, sentiment identifier 56 can score that negative change on a scale (e.g., 1-10 scale). Music selector 58 can compare the change score to a predetermined threshold and, if the change score meets or exceeds the threshold, determine that the currently playing track is not suitable for the event. The threshold can be preset by a user of system 50, such as host of a social event, or automatically calculated based on the type of event (e.g., a lower threshold may be appropriate for a smaller gathering of people than for a large gathering since a single negative reaction represents a larger percentage of the group). In some embodiments, this threshold can be decreased in the case that the participant 110N with a negative reaction to track 94N has a weighted or VIP status. As such, tracks that don't suit a VIP participant can be increasingly likely to be removed from playlist 92. Music preference analyzer 54 can modify music preferences 210N of a participant 110N who displays a negative reaction to a track (or strengthen an area of the participant's preferences if he or she shows a positive reaction). Music selector 58 can then recalculate which tracks 94A-N are suitable in light of the modified preferences profile 210N, thereby regenerating playlist 92, or select a track 94N from playlist 92 that has significantly different properties than the disliked track.

In some embodiments, music selector 58 can also determine a technique to transition from a currently playing music track/content 94N, which received a negative sentiment or which is no longer appropriate given a participant who just entered area 120, to a music track/content 94N of the modified playlist 92. Music selector 58 can select from transition techniques such as: complete the current track, then switch to the new track; fade out the current track and fade in the new track; and abruptly cut from the current track to the new track. The selected transition technique can be based on a change score, which is calculated above for the detected change, meeting or exceeding one or more transition thresholds. These transition thresholds can be preset by a user of system 50, such as host of a social event, or automatically calculated based on the type of event. In one example, if the change score fails to meet even a first transition threshold, then the current track is permitted to complete. However, if the change score meets the first transition threshold, then the current track can be faded out and the new track faded in. If the change score meets an even higher transition threshold, music selector 58 can abruptly switch from the current track to the new track. Music selector 58 can also be configured to perform certain types of transitions in response to certain events, such as fading in a new track in response to a participant 110N entering a department of a store or abruptly cutting to a new track if a weighted value participant walks into area 120 (e.g., in the case that a child or senior citizen enters a room in which music with explicit lyrics is playing, which would be inappropriate for such participants).

In some embodiments, area 120 can have more than one section, such as section 122A and section 122N, in each of which an embodiment of the present invention is separately carried out. In some embodiments, a separate system 50 can carry out embodiments separately for each section 122A-N, while in other embodiments, a single system 50 can carry out embodiments in each section 122A-N. Sections 122A-N can be different departments of a department store, different rooms in a house or public building (e.g., sections of a restaurant), etc. Sentiment identifier 56 can identify each section 122A-N, using the techniques discussed above, such that sentiment identifier 58 can distinguish, for example, between an electronics section and a home goods section of a department store. Music selector 58 can select music that is appropriate for each section 122N based on the identification of the section and the participants currently within that section 122N. As such, when a participant 110N moves from section 122A to section 122B, music selector 58 can modify an event profile for that section 122N to include music preferences 210N of participant 110N, while continuing to consider the identification of that section 122N.

Music player 60, as performed by computer system/server 12, can cause music content/track 94N from the set of music content/tracks 94A-N to be played. In some embodiments, in which system 50 is a part of a music streaming service or used in conjunction with a music streaming service, music player 60 can send music playlist 92 to the music streaming service or a portion thereof which, in turn, streams music data to a music player device 140 that outputs music 96. In some other embodiments, in which system 50 resides on music player device 140 (e.g., a dedicated device, a PC, a mobile device, etc.), music player 60 can cause track 94N to be retrieved, read, and outputted as music 96 from music player device 140. In still other alternative embodiments, music player 60 can send playlist 92 to a third party music player device, music player application, or music streaming website with instructions for the third party to play the music 96 on playlist 92.

Figure 5:
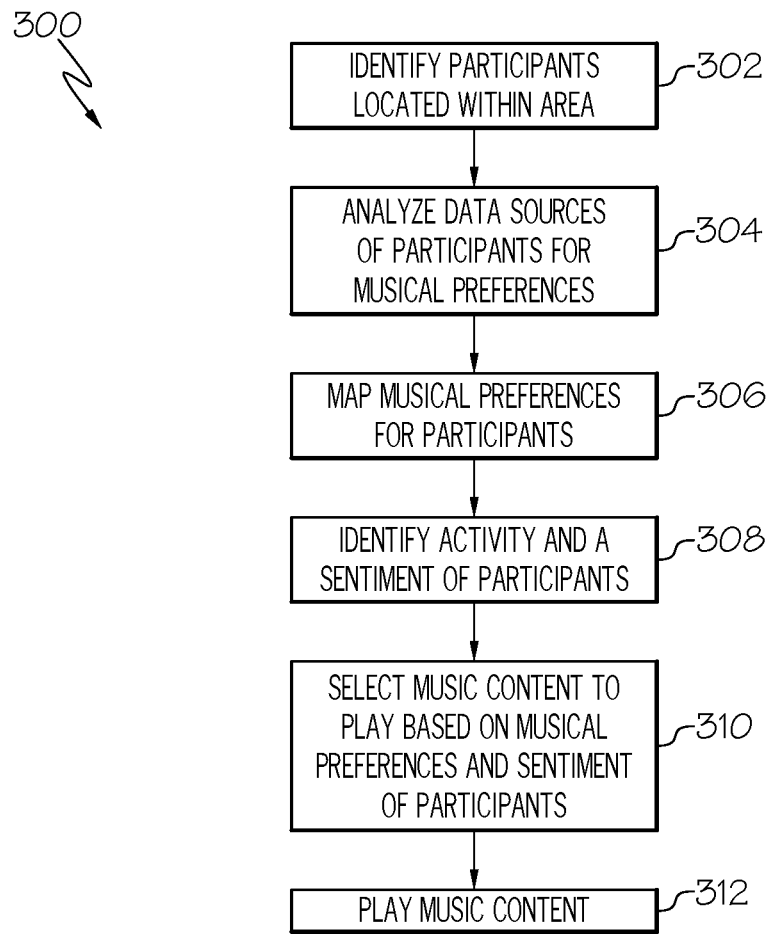
FIG. 5 shows a process flowchart for customizing content being consumed at a location according to illustrative embodiments.

As depicted in FIG. 5, in one embodiment, a system (e.g., computer system/server 12) carries out the methodologies disclosed herein. Shown is a process flowchart 300 for customizing content being consumed at a location. At 302, participant identifier 52 identifies a plurality of participants 110A-N as being located within an area 120, the plurality comprising a first participant 110A and a second participant 110N. At 304, music preference analyzer 54 analyzes a first data source 80 corresponding to the first participant 110A for musical preferences 210A of the first participant 110A and analyzing a second data source 80 corresponding to the second participant 110N for musical preferences 210N of the second participant 110N. At 306, music preference analyzer 54 maps, based on the analysis, a set of musical preferences 210A, 210N, for the first and second participants 110A, 110N, the mapping comprising linking related music preferences of the first and second participants 110A, 110N. At 308, sentiment identifier 56 identifies a sentiment of the plurality of participants based on a real-time data feed 72 that captures actions of the plurality of participants 110A-N located within the area 120. At 310, music selector 58 selects a scored set of music content 92 to play based on the mapped set of musical preferences 210A, 2010N and the identified sentiment of the plurality of participants 110 A-N. At 312, music player 60 causes music content 94N to be played from the set of music content.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for customizing content being consumed at a location. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for customizing content being consumed at a location. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided herein approaches to customize content being consumed at a location. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for customizing content being consumed at a location, comprising:
    identifying a plurality of participants as being located within a physical area, the plurality comprising a first participant and a second participant;
    analyzing a first data source corresponding to the first participant for musical preferences of the first participant and analyzing a second data source corresponding to the second participant for musical preferences of the second participant;
    mapping, based on the analysis, a set of musical preferences for the first and second participants, the mapping comprising linking related music preferences of the first and second participants;
    determining a closeness of relationship between the first participant and the second participant based on a number of links to mutual friends in a computerized social network;
    identifying a value corresponding to activities, expressions, and actions indicative of a sentiment of the second participant of the plurality of participants based on a real-time data feed that captures actions of the plurality of participants located within the area, the actions comprising at least one communication selected from the group consisting of: a verbal statement, a non-verbal expressive action comprising body language in the physical area, and a paralanguage vocal feature, wherein additional values are also identified corresponding to the captured actions of the plurality of participants located within the area;
    assigning the identified value of the second participant a weight corresponding to the determined closeness of relationship between the first participant and the second participant;
    selecting a scored set of music content to play based on the mapped set of musical preferences and the identified weighted value of the second participant and the additional values of the plurality of participants; and
    causing music content to be played from the set of music content.

2. The method of claim 1, wherein each of the plurality of participants are identified by an identification signal from a mobile device of the participant, the type of signal being a signal for a network selected from the group consisting of: LAN, WAN, broadband, wireless, and GPS.

3. The method of claim 1, wherein the first and second data sources are selected from the group consisting of: social media, internet browsing history, and a music service; and the musical preferences of the first and second participants are selected from the group consisting of: a genre, an artist, a musical element, a musical style, and a musical era.

4. The method of claim 1, the method further comprising:
    detecting a change, the change being selected from the group consisting of: an entrance of a participant from the area, an exit of a participant from the area, a change in a sentiment of one or more participants of the plurality of participants, and a change in the area;
    modifying the scored set of music content to play based on the mapped set of musical preferences and the detected change;
    determining a technique to transition from a currently playing music content to different music content of the modified scored set of music content; and
    playing the music content of the modified scored set of music content.

5. The method of claim 4, the method further comprising:
    rating the detected change on a scale;
    comparing the rating to a predetermined threshold on the scale; and
    modifying the scored set of music content responsive to the rating meeting or exceeding the threshold.

6. The method of claim 1, the identifying the sentiment of the plurality of participants further comprising:
    obtaining an auditory or visual reading of at least one participant of the plurality of participants from the real-time data feed;
    analyzing the reading for an action of the at least one participant, the action being of the actions of the plurality of participants, the action of the at least one participant being selected from the group consisting of:

a posture, a facial expression, space usage, a hand gesture, foot movement, and a vocalization, of the at least one participant;
assigning a value to the action of the at least one participant; and
identifying music content in the set of music content associated with the assigned value.

7. The method of claim 1, the method further comprising:
assigning a weighted value to at least one participant of the plurality of participants; and
scoring the set of music content based on an application of the weighted value to a set of musical preferences or a sentiment of the at least one participant of the plurality of participants.

8. The method of claim 1, wherein the area comprises a plurality of sections and the method further comprises:
tracking a location of each of the plurality of participants, the location being a section of the plurality of sections;
detecting an identity of each section of the plurality of sections, the identity being selected from the group consisting of: a venue and an event;
selecting a scored set of music content to play in each section based on the detected identity of the section; and
modifying the scored set of music content to play in each section based on a movement of at least one participant of the plurality of participants from a first section to a second section of the plurality of sections.

9. A computer system for customizing content being consumed at a location, the computer system comprising:
a memory device comprising program instructions;
a bus coupled to the memory device; and
a processor, for executing the program instructions, coupled to a customized audio content engine via the bus that when executing the program instructions causes the system to:
identify a plurality of participants as being located within a physical area, the plurality comprising a first participant and a second participant;
analyze a first data source corresponding to the first participant for musical preferences of the first participant and analyzing a second data source corresponding to the second participant for musical preferences of the second participant;
map, based on the analysis, a set of musical preferences for the first and second participants, the mapping comprising linking related music preferences of the first and second participants;
determine a closeness of relationship between the first participant and the second participant based on a number of links to mutual friends in a computerized social network;
identify a value activities, expressions, and actions indicative of a sentiment of the second participant of the plurality of participants based on a real-time data feed that captures actions of the plurality of participants located within the area, the actions comprising at least one communication selected from the group consisting of: a verbal statement, a non-verbal expressive action comprising body language in the physical area, and a paralanguage vocal feature, wherein additional values are also identified corresponding to the captured actions of the plurality of participants located within the area;
assign the identified value of the second participant a weight corresponding to the determined closeness of relationship between the first participant and the second participant;
select a scored set of music content to play based on the mapped set of musical preferences and the identified weighted value of the second participant and the additional values of the plurality of participants; and
cause music content to be played from the set of music content.

10. The computer system of claim 9, wherein each of the plurality of participants are identified by an identification signal from a mobile device of the participant, the type of signal being a signal for a network selected from the group consisting of: LAN, WAN, broadband, wireless, and GPS; wherein the first and second data sources are selected from the group consisting of: social media, internet browsing history, and a music service; and wherein the musical preferences of the first and second participants are selected from the group consisting of: a genre, an artist, a musical element, a musical style, and a musical era.

11. The computer system of claim 9, the instructions further causing the system to:
detect a change, the change being selected from the group consisting of: an entrance of a participant from the area, an exit of a participant from the area, a change in a sentiment of one or more participants of the plurality of participants, and a change in the area;
rate the detected change on a scale;
compare the rating to a predetermined threshold on the scale;
modify, responsive to the rating meeting or exceeding the threshold, the scored set of music content to play based on the mapped set of musical preferences and the detected change;
determine a technique to transition from a currently playing music content to different music content of the modified scored set of music content; and
play the music content of the modified scored set of music content.

12. The computer system of claim 9, the instructions further causing the system to:
obtain an auditory or visual reading of at least one participant of the plurality of participants from the real-time data feed;
analyze the reading for an action of the at least one participant, the action being of the actions of the plurality of participants, the action of the at least one participant being selected from the group consisting of: a posture, a facial expression, space usage, a hand gesture, foot movement, and a vocalization, of the at least one participant;
assign a value to the action of the at least one participant; and
identify music content in the set of music content associated with the assigned value.

13. The computer system of claim 9, the instructions further causing the system to:
assign a weighted value to at least one participant of the plurality of participants; and
score the set of music content based on an application of the weighted value to a set of musical preferences or a sentiment of the at least one participant of the plurality of participants.

14. The computer system of claim 9, wherein the area comprises a plurality of sections and the instructions further cause the system to:

track a location of each of the plurality of participants, the location being a section of the plurality of sections;

detect an identity of each section of the plurality of sections, the identity being selected from the group consisting of: a venue and an event;

select a scored set of music content to play in each section based on the detected identity of the section; and modify the scored set of music content to play in each section based on a movement of at least one participant of the plurality of participants from a first section to a second section of the plurality of sections.

15. A computer program product for customizing content being consumed at a location, the computer program product comprising a computer readable hardware storage device, and program instructions stored on the computer readable hardware storage device, to:

identify a plurality of participants as being located within a physical area, the plurality comprising a first participant and a second participant;

analyze a first data source corresponding to the first participant for musical preferences of the first participant and analyzing a second data source corresponding to the second participant for musical preferences of the second participant;

map, based on the analysis, a set of musical preferences for the first and second participants, the mapping comprising linking related music preferences of the first and second participants;

determine a closeness of relationship between the first participant and the second participant based on a number of links to mutual friends in a computerized social network;

identify a value corresponding to activities, expressions, and actions indicative of a sentiment of the second participant of the plurality of participants based on a real-time data feed that captures actions of the plurality of participants located within the area, the actions comprising at least one communication selected from the group consisting of: a verbal statement, a non-verbal expressive action comprising body language in the physical area, and a paralanguage vocal feature, wherein additional values are also identified corresponding to the captured actions of the plurality of participants located within the area;

assign the identified value of the second participant a weight corresponding to the determined closeness of relationship between the first participant and the second participant;

select a scored set of music content to play based on the mapped set of musical preferences and the identified weighted value of the second participant and the additional values of the plurality of participants; and cause music content to be played from the set of music content.

16. The computer program product of claim 15, wherein each of the plurality of participants are identified by an identification signal from a mobile device of the participant, the type of signal being a signal for a network selected from the group consisting of: LAN, WAN, broadband, wireless, and GPS; wherein the first and second data sources are selected from the group consisting of: social media, internet browsing history, and a music service; and wherein the musical preferences of the first and second participants are selected from the group consisting of: a genre, an artist, a musical element, a musical style, and a musical era.

17. The computer program product of claim 15, the computer readable storage device further comprising instructions to:

detect a change, the change being selected from the group consisting of: an entrance of a participant from the area, an exit of a participant from the area, a change in a sentiment of one or more participants of the plurality of participants, and a change in the area;

rate the detected change on a scale;

compare the rating to a predetermined threshold on the scale;

modify, responsive to the rating meeting or exceeding the threshold, the scored set of music content to play based on the mapped set of musical preferences and the detected change;

determine a technique to transition from a currently playing music content to different music content of the modified scored set of music content; and play the music content of the modified scored set of music content.

18. The computer program product of claim 15, the computer readable storage device further comprising instructions to:

obtain an auditory or visual reading of at least one participant of the plurality of participants from the real-time data feed;

analyze the reading for an action of the at least one participant, the action being of the actions of the plurality of participants, the action of the at least one participant being selected from the group consisting of: a posture, a facial expression, space usage, a hand gesture, foot movement, and a vocalization, of the at least one participant;

assign a value to the action of the at least one participant; and identify music content in the set of music content associated with the assigned value.

19. The computer program product of claim 15, the computer readable storage device further comprising instructions to:

assign a weighted value to at least one participant of the plurality of participants; and score the set of music content based on an application of the weighted value to a set of musical preferences or a sentiment of the at least one participant of the plurality of participants.

20. The computer program product of claim 15, wherein the area comprises a plurality of sections and the computer readable storage device further comprises instructions to:

track a location of each of the plurality of participants, the location being a section of the plurality of sections;

detect an identity of each section of the plurality of sections, the identity being selected from the group consisting of: a venue and an event;

select a scored set of music content to play in each section based on the detected identity of the section; and modify the scored set of music content to play in each section based on a movement of at least one participant of the plurality of participants from a first section to a second section of the plurality of sections.

* * * * *